April 21, 1936. J. MASIN ET AL 2,038,119
VACUUM COFFEE MAKING APPARATUS
Filed July 12, 1934
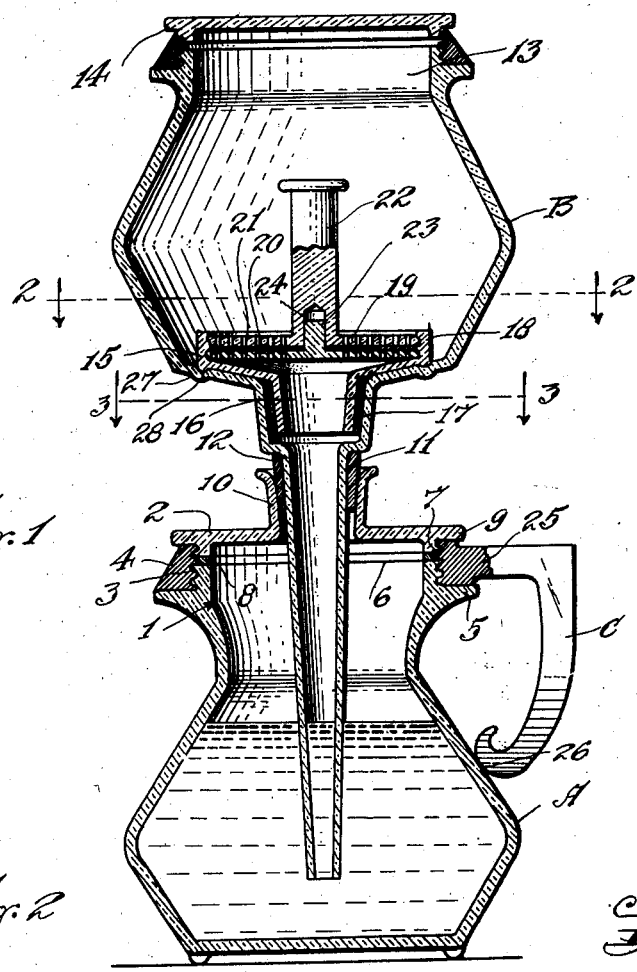
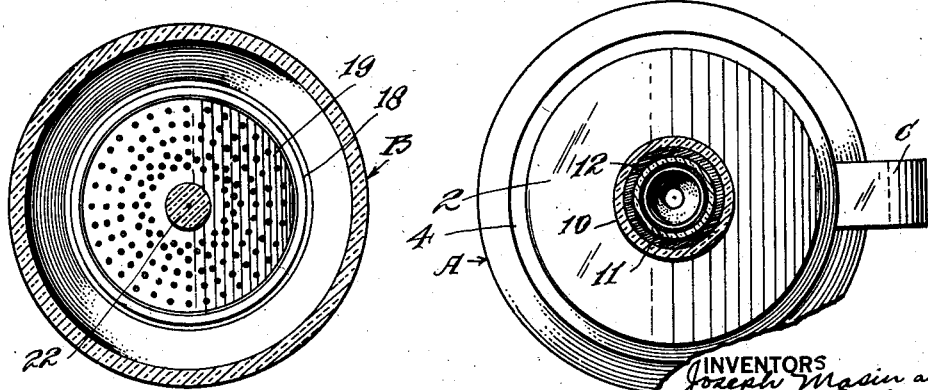

Patented Apr. 21, 1936

2,038,119

UNITED STATES PATENT OFFICE 2,038,119

VACUUM COFFEE MAKING APPARATUS

Joseph Masin and Isaac D. Richheimer, New York, N. Y., assignors to Tricolator Company Inc., New York, N. Y., a corporation of New York Application July 12, 1934, Serial No. 734,792

4 Claims. (Cl. 53—3)

This invention relates to so-called vacuum coffee making apparatus of the type which includes two receptacles one of which initially receives water and the other of which contains the ground coffee, the coffee containing receptacle being superposed upon and communicating with the other receptacle during making of the coffee. In operation, upon heating of the water in the lower receptacle, pressure is created which causes the water to be forced upwardly into the upper receptacle and when the water is cooled in the lower receptacle a partial vacuum is formed which quickly draws the water from the upper receptacle to the lower receptacle. The receptacles are then disconnected and the coffee is poured from the lower receptacle.

In known apparatus of this character the lower receptacle has been formed with a narrow mouth or neck into which a nipple on the upper receptacle is inserted for connecting the two receptacles and great difficulty has been encountered in cleaning the lower receptacle because of inaccessibility to the interior thereof through the narrow mouth or neck.

Therefore, two objects of our invention are to provide coffee making apparatus of the general character described embodying a novel and improved construction for the mouth of the lower water containing receptacle whereby the receptacle shall have a large mouth to permit access to the interior of the receptacle for cleaning; and to provide such a construction including a novel and improved removable combination cover for the receptacle and connector for receiving the upper receptacle.

Other objects of our invention are to provide a novel and improved construction and combination of a strainer with the upper receptacle whereby particles of ground coffee shall be prevented from passing from the upper receptacle into the water in the lower receptacle, and to obtain other advantages and results as will be brought out by the following description.

Referring to the accompanying drawing in which corresponding and like parts are designated throughout the several views by the same reference characters, Figure 1 is a vertical longitudinal sectional view through a coffee making apparatus embodying our invention.

Figure 2 is a horizontal sectional view on the line 2—2 of Figure 1, and

Figure 3 is a horizontal sectional view on the line 3—3 of Figure 1.

Specifically describing the illustrated embodiment of the invention, the apparatus includes a receptacle A for containing water and a receptacle B for containing the ground coffee. Preferably these two receptacles are formed of glass, porcelain or like material so as to be unaffected by the liquid and coffee. During making of coffee, the receptacle B is disposed in superposed relation to the receptacle A and is in communication with the interior of the latter, as shown in Figure 1.

In accordance with the invention, the lower receptacle A has a mouth or opening 1 of sufficiently large diameter to permit the insertion of a human hand for the purpose of cleaning the interior of the receptacle, and with the mouth of the receptacle cooperates a combination disk-like closure and connector 2. For attaching the closure 2 to the receptacle, the exterior of the receptacle adjacent its rim is provided with coarse screw threads 3 of long pitch, preferably tapered threads, and a metallic ring 4 is screwed upon the threads 3. A shoulder 5 is provided on the receptacle against which the ring 4 may abut to limit the movement of the ring onto the receptacle. The ring is of such width that a portion thereof projects beyond the rim 6 of the mouth of the receptacle and within this projecting portion of the ring is fitted the closure 2 which has exterior screw threads 7 to fit the threads of the ring. Preferably a packing gasket 8 is interposed between the closure 2 and the rim 6 of the mouth of the receptacle to provide a tight joint, and the edge of the closure may be serrated or knurled at 9 to facilitate application and removal of the closure to and from the receptacle.

The closure has an integral outwardly flaring tubular extension 10 substantially smaller in diameter than said closure which removably receives a correspondingly tapered nipple 11 projecting from the bottom of the upper receptacle B. A packing bushing 12 is mounted on the nipple 11 to form a tight joint with the tubular extension 10.

The upper receptacle B has a mouth 13 through which the coffee may be placed in the receptacle and this mouth is normally closed by a cover 14 mounted on the receptacle in substantially the same manner in which the closure 2 is mounted on the receptacle A. Within the upper receptacle and at the bottom thereof is arranged a strainer which is shown as comprising a base 15 to rest upon the bottom of the receptacle and having a tubular extension 16 to fit within the inner end of the nipple 11. A sleeve 17 of cork or the like surrounds the extension 16 to provide a resilient tight connection between said extension and the nipple. The base has a circular upstanding flange 18 within which is mounted a perforated disc 19. This disc may be loosely fitted within the flange or the flange may be screw threaded or provided with a sectional thread for fastening the plate in the base. Upon the plate is located a sheet 20 of filter material and above the sheet is arranged a perforated cap plate 21 that is screw threaded in the flange 18 and has a handle 22 for manipulating the whole strainer to place it in and remove it from the receptacle. Preferably the disc 19 has a central upstanding stud 23 to serve as a handle for manipulating the disc, and the cap plate 21 has a recess 24 to loosely receive the stud 23 when the parts are assembled.

The base 15, disc 16 and cap plate 21 are desirably formed of glass, porcelain or like material so as to obviate contact of the coffee and liquid with metal parts.

In use, the filter parts will be assembled outside the receptacle, the disc 19 being placed in the base, the filter material on the disc and then the cap plate on the filter material. The whole assembled filter may then be picked up by the handle 22 and the tubular extension 16 inserted into the inner end of the nipple 11. Then ground coffee may be placed in the receptacle B on and around the filter.

For making coffee, water is placed in the receptacle A and the closure 2 is applied as shown in Figure 1, after which the nipple 11 of the upper receptacle is tightly fitted in the tubular extension 10. When the water is heated the pressure in the receptacle A forces the water through the nipple 11 and the strainer and coffee into the receptacle B and when the water begins to cool, a partial vacuum is formed in the receptacle A which quickly draws the water downwardly through the coffee and the filter. All solid particles of coffee are strained out by the strainer and filter material. After the water has returned to the receptacle A the receptacle B may be removed, after which the coffee may be poured through the tubular extension 10 or a separate discharge nozzle might be provided.

Preferably a handle C is connected to the receptacle A to facilitate pouring and this handle may have one end rigidly secured to the ring 4 as at 25 and its other end resting against the side of the receptacle as at 26.

It should be understood that the cover 14 of the upper receptacle need not have an air tight fit since entrance of atmospheric air into the upper receptacle facilitates the operation of the apparatus.

It will be observed that the closure 2 can be easily and quickly removed from the receptacle and that the connection of the closure to the receptacle is simple and secure. No metal parts are exposed to contact with the coffee or liquid. The strainer is simple in construction and its parts can be easily and quickly separated for cleaning and assembled for use. The strainer is securely mounted in the receptacle against accidental tilting so that there is no possibility of the strainer being displaced by stirring of the coffee in the receptacle B or by jarring of the receptacle; and therefore there is a minimum of possibility of particles of coffee passing between the strainer and the bottom of the receptacle.

Preferably the bottom of the base 15 has an annular rib 27 to fit in an annular groove 28 in the bottom of the receptacle to cooperate with the extension 16 in holding the strainer firmly against movement on the bottom of the receptacle.

Obviously the details of construction of the apparatus may be modified and changed by those skilled in the art without departing from the spirit or scope of the invention and therefore we do not desire to be understood as limiting ourselves except as required by the following claims when construed in the light of the prior art.

Having thus described our invention, what we claim is:

1. Coffee making apparatus comprising a lower receptacle having a mouth surrounded by a rim and an exterior thread on said rim, an interiorly threaded ring screwed on said rim and projecting outwardly therebeyond, a closure having a removable threaded connection with said projecting portion of the ring and provided with a tubular extension, and an upper receptacle having a nipple to removably seat in said tubular extension and project into the lower receptacle.

2. Coffee making apparatus comprising a lower receptacle having a mouth surrounded by a rim and an exterior thread on said rim, an interiorly threaded ring screwed on said rim and projecting outwardly therebeyond, a packing ring on the edge of said rim, a closure having a removable threaded connection with the projecting portion of said ring and seated against said packing ring, said closure also having a tubular extension, and an upper receptacle having a nipple to removably seat in said tubular extension and project into the lower receptacle.

3. Coffee making apparatus comprising a lower receptacle having a mouth surrounded by a rim, a ring secured on said rim and having a portion projecting therebeyond and formed with an interior screw thread, a closure having a removable threaded connection with said projecting portion of the ring and provided with a tubular extension, and an upper receptacle having a nipple to removably seat in said tubular extension and project into the lower receptacle.

4. Coffee making apparatus comprising a lower receptacle formed of ceramic material having a mouth surrounded by a rim, a metal ring secured on said rim and having a portion projecting therebeyond and formed with an interior screw thread, a ceramic closure for said mouth having a removable threaded connection with said projecting portion of the ring and provided with an integral tubular extension, and an upper receptacle of ceramic material having a nipple to removably seat in said tubular extension and project into the lower receptacle.

JOSEPH MASIN.
ISAAC D. RICHHEIMER.